(12) United States Patent
Ryz

(10) Patent No.: US 9,901,035 B2
(45) Date of Patent: Feb. 27, 2018

(54) ROUND BALER WITH A BELT ASSEMBLY AND A METHOD FOR MANUFACTURING A ROLLER FOR A BELT ASSEMBLY

(71) Applicant: CNH Industrial America LLC, New Holland, PA (US)

(72) Inventor: Jakub Ryz, Gryfino (PL)

(73) Assignee: CNH Industrial America LLC, New Holland, PA (US)

( * ) Notice: Subject to any disclaimer, the term of this patent is extended or adjusted under 35 U.S.C. 154(b) by 239 days.

(21) Appl. No.: 14/391,449

(22) PCT Filed: Apr. 4, 2013

(86) PCT No.: PCT/EP2013/057124
§ 371 (c)(1),
(2) Date: Oct. 9, 2014

(87) PCT Pub. No.: WO2013/152990
PCT Pub. Date: Oct. 17, 2013

(65) Prior Publication Data
US 2015/0075130 A1    Mar. 19, 2015

(30) Foreign Application Priority Data
Apr. 11, 2012  (BE) .................... 2012/0243

(51) Int. Cl.
*A01F 15/18* (2006.01)
*B32B 37/12* (2006.01)
(Continued)

(52) U.S. Cl.
CPC .......... *A01F 15/18* (2013.01); *B32B 37/1284* (2013.01); *B32B 37/142* (2013.01);
(Continued)

(58) Field of Classification Search
CPC ...... A01F 15/07; A01F 15/08; A01F 15/0833; A01F 15/085; A01F 15/106; A01F 15/18;
(Continued)

(56) References Cited

U.S. PATENT DOCUMENTS 2,568,174 A * 9/1951 Staacke ................ B65G 39/071
198/843
2,628,709 A * 2/1953 Steinmetz ............ B65G 39/073
198/494

(Continued)

FOREIGN PATENT DOCUMENTS

DE      7513533 U    10/1976
DE      2707492 A1    8/1978
(Continued)

*Primary Examiner* — Jimmy T Nguyen
(74) *Attorney, Agent, or Firm* — Patrick M. Sheldrake

(57) ABSTRACT

A round baler includes a bale-forming chamber with a belt assembly for rolling a bale, the assembly includes a plurality of parallel side-by-side belts trained about rollers transverse to the belts, wherein the rollers have a shaft with a plurality of belt-driving sleeves mounted thereon. The belt-driving sleeves have a circumferential groove and the belts have a longitudinal protrusion to track the belt in the groove of the belt-driving sleeve.

8 Claims, 5 Drawing Sheets

(51) Int. Cl.
*B32B 37/14* (2006.01)
*A01F 15/07* (2006.01)

(52) U.S. Cl.
CPC ... *A01F 2015/077* (2013.01); *A01F 2015/183* (2013.01); *A01F 2015/186* (2013.01); *Y10T 29/49826* (2015.01)

(58) Field of Classification Search
CPC .......... A01F 2015/077; A01F 2015/183; A01F 2015/186; B65G 39/071; B65G 39/073; B65G 39/16; B65G 15/50
USPC .............. 100/87, 88; 56/341; 198/835, 842; 492/30
See application file for complete search history.

(56) References Cited

U.S. PATENT DOCUMENTS

| | | | | |
|---|---|---|---|---|
| 2,966,065 | A * | 12/1960 | Renner | B65G 39/071 |
| | | | | 193/37 |
| 3,082,858 | A * | 3/1963 | King | B65G 39/16 |
| | | | | 198/300 |
| 3,980,174 | A * | 9/1976 | Conrad | B65G 15/46 |
| | | | | 198/835 |
| 4,428,282 | A | 1/1984 | Anstey | |
| 4,870,812 | A | 10/1989 | Jennings et al. | |
| 5,096,045 | A * | 3/1992 | Feldl | B65G 15/24 |
| | | | | 198/583 |
| 5,165,333 | A * | 11/1992 | Ratzlaff | A01F 15/07 |
| | | | | 100/88 |
| 5,213,202 | A | 5/1993 | Brink | |
| 5,367,865 | A | 11/1994 | Jennings et al. | |
| 5,749,289 | A | 5/1998 | Anderson et al. | |
| 5,822,959 | A | 10/1998 | Norton | |
| 5,911,307 | A * | 6/1999 | Kraft | B65G 15/64 |
| | | | | 198/846 |
| 5,941,168 | A | 8/1999 | Kluver et al. | |
| 7,021,457 | B1 * | 4/2006 | Schiltz | B65G 15/64 |
| | | | | 198/835 |
| 7,565,967 | B2 * | 7/2009 | Maine, Jr. | B65G 15/54 |
| | | | | 198/834 |
| 7,640,720 | B1 | 1/2010 | Lovett et al. | |
| 8,579,774 | B2 | 11/2013 | Derscheid | |
| 2002/0134651 | A1 * | 9/2002 | Itoh | B65G 15/64 |
| | | | | 198/835 |
| 2011/0009251 | A1 * | 1/2011 | Derscheid | A01F 15/18 |
| | | | | 492/30 |

FOREIGN PATENT DOCUMENTS

| | | |
|---|---|---|
| DE | 20110054 U1 | 8/2001 |
| GB | 1602067 | 11/1981 |
| GB | 2201630 | 9/1988 |
| JP | S6081347 U | 6/1985 |

* cited by examiner

ROUND BALER WITH A BELT ASSEMBLY AND A METHOD FOR MANUFACTURING A ROLLER FOR A BELT ASSEMBLY

This application is the US National Stage filing of International Application Serial No. PCT/EP2013/057124 filed on Apr. 4, 2013 which claims priority to Belgian Application BE2012/0243 filed Apr. 11, 2012, each of which is incorporated herein by reference in its entirety.

FIELD OF THE INVENTION

The present invention relates to a belt assembly for a round baler.

BACKGROUND OF THE INVENTION

Round balers have become quite prevalent for their capability of producing a conveniently sized cylindrical bale, very often automatically wrapped with a sheeting material such as net or film. The round balers generally have a bale-forming chamber defined by a pair of spaced-apart side walls and a plurality of parallel belts trained around a plurality of rolls spanning between the side walls. A pick-up mechanism picks up crop material, such as hay, from the ground as the baler travels across the field, and is fed into a fixed or expandable chamber where it is rolled up to form a compact cylindrical hay package. While still inside the bale-forming chamber in its compacted form, the outer surface of the package is wrapped with twine or other wrapping material, such as film or net, prior to ejection of the wrapped bale from the chamber onto the ground for subsequent handling.

In a round baler of this type, there exists a belt tracking problem. When crop enters in between the belts, it tends to wrap around the roller and to cause sideway displacement of the belt. When adjacent belts come into contact with each other, the friction leads to substantial wear of the belts. Various attempts have been made to solve the belt tracking problem. These belt tracking problems are especially relevant as the round baler comprises a plurality of rather narrow parallel belts which are arranged close to each other. When the parallel path of the belts is not sufficiently assured, adjacent belts risk interference or entanglement with each other.

A European patent application EP2272320 presents a drive roller for flat belts, wherein the roller comprises lagging with grooves substantially non-parallel to the direction of travel of the belt, e.g. in a herringbone pattern. The grooves provide path for moisture or foreign material to be displaced from the driving surface between the roller and the flat belt.

A UK patent application GB2201630 relates to a baling machine in which the rolls are provided with rubber collars with continuous grooves therein, in the form of rings, which converge toward their bases. There are 10 to 200 grooves per 10 mm length of collar. The plurality of narrow grooves enable liquid to escape from the driving surface between the roller and the flat belt. A U.S. Pat. No. 5,213,202 presents a similar approach, wherein the rollers comprise opposed helical grooves.

A U.S. Pat. No. 5,941,168 presents a baler with full-width belts, extending substantially a transverse distance from one of the side walls of the bale-forming chamber to the other of the side walls. A roller for guiding the belt is provided with a helix structure wherein the helix acts as an auger to convey debris away from the center and toward the ends of the roller. The belt may have a set of cleats extending transversely across the inner surface of the belt to engage and sweep forage material toward the helix on the respective roller, and also to help break up the material.

A U.S. Pat. No. 4,428,282 presents a baler with rollers having a plurality of sleeves thereon, each underlying a respective one of the belts and supporting the longitudinal edges of the flat belts out of contact with the core of the roller, to reduce the tendency of the roller to become wrapped with crop material. A similar approach is presented in a U.S. Pat. No. 5,749,289.

A German utility model DE20110054 presents a round baler with rollers having a plurality of sleeves which are narrower than the belts. The sleeves of one roller are shifted with respect to the sleeves of another roller, such as to effect a belt running correction.

A German utility model DE7513533 presents a round baler with rollers having spherical protrusions which are configured to lift up the central part of the belt and to keep the belt positioned on the protrusion.

SUMMARY OF THE INVENTION

A round baler comprises a bale-forming chamber with a belt assembly for rolling a bale, the assembly comprising a plurality of parallel side-by-side belts trained about rollers transverse to the belts, wherein the rollers comprise a shaft with a plurality of belt-driving sleeves mounted thereon, wherein the belt-driving sleeves have a circumferential groove and the belts have a longitudinal protrusion configured to track the belt in the groove of the belt-driving sleeve.

Preferably, the shaft has a flat surface and the belt-driving sleeves have a height (H) greater than the depth (d) of the groove.

Preferably, the depth (d) of the groove is from 30% to 70% of the height (H) of the belt-driving sleeve.

Preferably, the belt-driving sleeves have a plurality of interconnected channels at the internal surface of the belt-driving sleeve, the channels being connected with an opening in the outer surface of the belt-driving sleeve, via which an adhesive is introduced between the internal surface of the belt-driving sleeve and the outer surface of the shaft.

Preferably, the belt-driving sleeves are mounted on the shaft adjacently to each other and have a width larger than the width of the belt.

Preferably, the belt-driving sleeves have a convex outer surface in which the grooves are formed.

Preferably, the longitudinal protrusions of the belts have a toothed longitudinal cross-section.

Preferably, the belt-driving sleeves are molded from rubber or hard plastic.

Preferably, the belt-driving sleeves have a plurality of circumferential grooves and the belts have a plurality of longitudinal protrusions configured to track the belt in the grooves of the belt-driving sleeve.

Another object of the present invention is a method for manufacturing the roller for a round baler according to the previous object of the invention, the method comprising the steps of mounting the plurality of belt-driving sleeves on the shaft by: inserting the shaft into the central opening of the plurality of belt-driving sleeves; sliding the respective belt driving sleeves along the shaft to the desired position on the shaft; and fixing the plurality of belt driving sleeves on the shaft.

Preferably, the method additionally comprises the steps of mounting the plurality of belt-driving sleeves on the shaft, each belt-driving sleeve having a plurality of interconnected channels at the internal surface of the belt-driving sleeve, the channels being connected with an opening in the outer surface of the belt-driving sleeve, fixing the plurality of belt driving sleeves on the shaft by: introducing adhesive, via the opening, between the internal surface of the belt-driving sleeve and the outer surface of the shaft; and curing the adhesive.

Preferably, the method involves mounting the plurality of belt-driving sleeves on the shaft adjacent to each other.

BRIEF DESCRIPTION OF THE DRAWINGS

The object of the invention is shown by means of exemplary embodiment on a drawing, in which.

DETAILED DESCRIPTION OF PREFERRED EMBODIMENTS

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
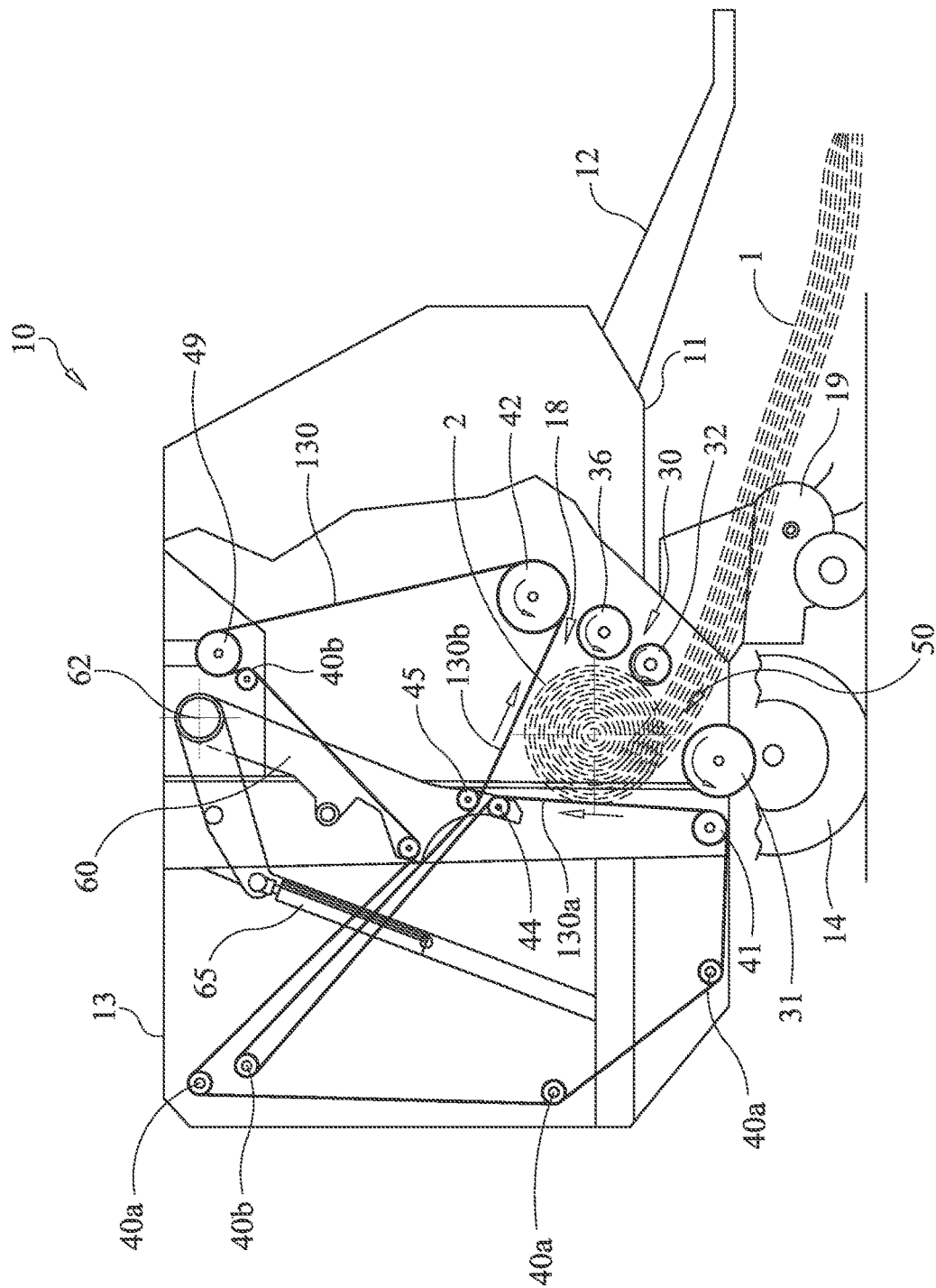
FIG. 1 is a side view of a typical agricultural round baler on which the present invention is useful showing a bale forming chamber configured at the beginning of a bale forming cycle.
Figure 2:
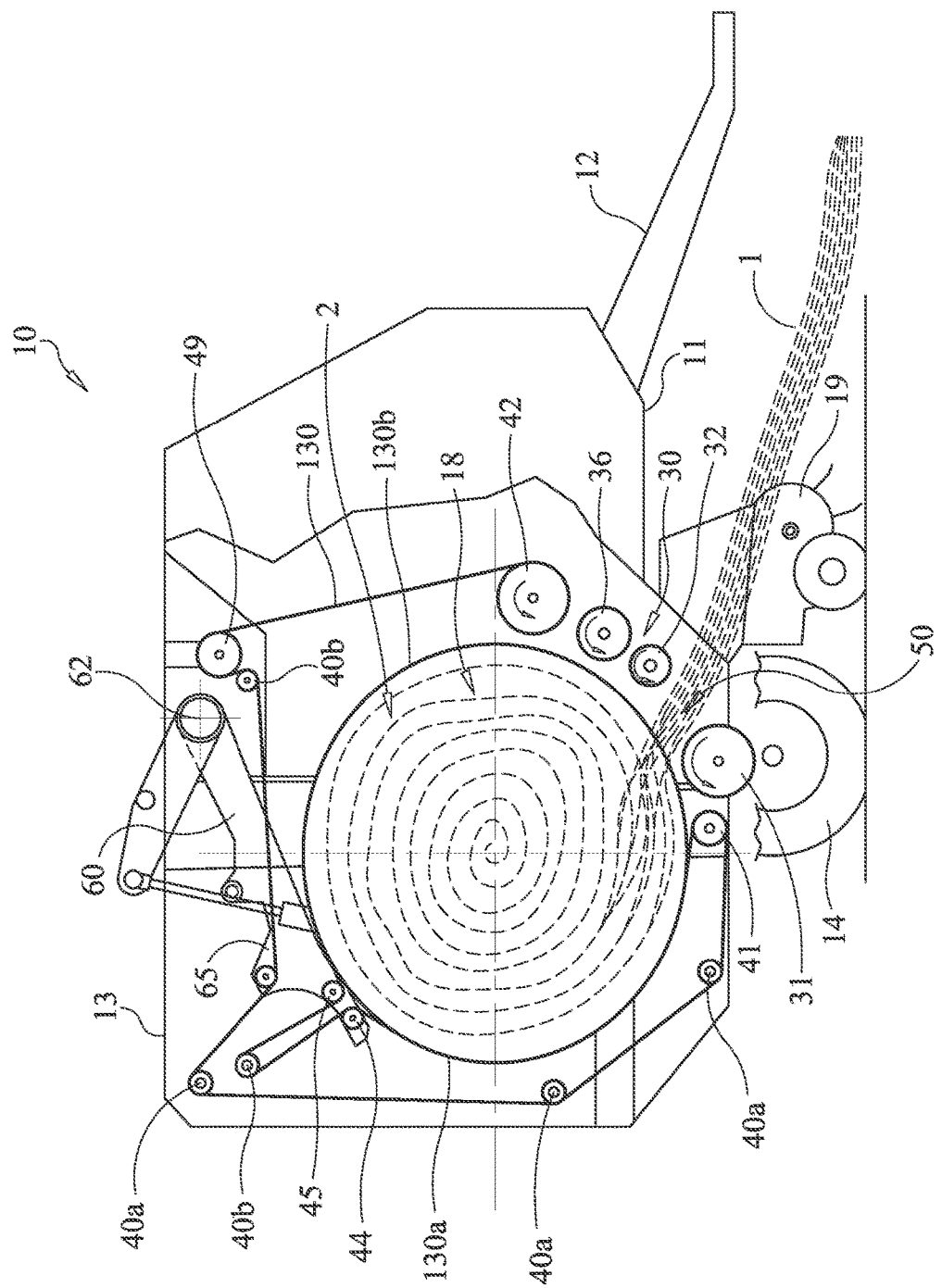
FIG. 2 is a side view of the agricultural round baler in FIG. 1 in which the bale forming chamber is configured as it would be near the end of a bale forming cycle.

Referring to FIGS. 1 and 2, a generally well-known round baler 10 is shown to comprise a main frame 11 terminating forwardly in a tongue 12 and rearwardly, slightly beyond a transverse axle to which a pair of wheels 14 (only one shown) are mounted, thus forming a wheel supported main frame. The main frame 11 supports a plurality of movable belts 130, transversely arranged fixed rolls 30, and belt guide rolls 40a, 40b which together with a pair of generally parallel and opposing sidewalls establish an expandable bale-forming chamber 18. Cut crop material 1 is picked up by transverse pickup 19 and fed into bale-forming chamber 18 where it is formed into a cylindrically shaped bale 2 by movement of the belts 130 and rolls 30. A completed bale 2, that is one that has reached a desired diameter as shown in FIG. 2, is then wrapped with twine or a wrapping material to maintain the bale shape after ejection from the baler. Upon completion of the wrapping process, the tailgate 13 pivots upwardly to open the rearward portion of the bale forming chamber 18 and the bale 2 is ejected onto the ground.

Fixed rolls 30 positioned in bale forming chamber 18 comprise at least a floor roll 31 and a starter roll 32 which are transversely aligned with respect to the main frame. Other fixed rolls (e.g., 36) may be used to further define the lower and forward portions of the bale chamber periphery. Fixed rolls 30 are driven in the direction shown by conventional means (i.e., chains and sprockets or gears) connected to and powered by a tractor power take-off (not shown). Floor roll 31 and starter roll 32 are spaced-apart to form a throat or crop infeed opening 50 through which crop material enters the bale-forming chamber. The rearward and upper portions of the bale forming chamber 18 are defined by movable belts 130 (shown as 130a and 130b, respectively, in the bale forming chamber), a plurality of side-by-side belts spanning the guide rolls 40a, 40b in a manner to create the expandable bale chamber 18. The belts are powered by drive roller 49 to move around the guide rollers 40a, 40b in a generally clockwise direction around the bale forming chamber as shown which, in conjunction with rotation of the fixed rolls 30, causes the incoming crop material to be coiled in a generally clockwise direction to form the bale.

Some of the belt guide rollers 40a, 40b are positioned on a belt tension arm 60, specifically a first guide roller 44 and a second guide roller 45, where they manage movement of the belts 130 as the bale forming in the chamber expands. First and second guide rollers 44, 45, are positioned closely adjacent to each other, separated by a space sufficient for passage of the belts and to prevent contact between the portions of the belts moving in opposite directions through the space. The positioning of guide rollers 44, 45 is such that a first portion of the belts 130a spans unsupported between lower idler roller 41 and first guide roller 44 and a second portion of the belts 130b spans between second guide roller 45 and forward idler roller 42. When the bale chamber is empty or a bale core is being initially formed, the belts will follow a generally straight path between the rollers defining a chamber having a generally vertical portion of the belts rearwardly in the chamber and a generally horizontal portion of the belts upwardly in the chamber. This creates a core formation chamber with rearward and topward boundaries that are generally right-angled relative to each other. As the bale grows, the belts will follow the perimeter contour of the bale in the chamber and the angle between the rearward and topward portions will increase to a near-tangential relationship when the bale is fully formed.

Belt tension arm 60 is pivotally connected to frame 11 at a pivot point 62 positioned generally above the bale forming chamber and slightly forward of the bale roll centerline. Tension arm 60 is pivotable between generally first and second positions and is moved by actuator 65 between those positions to maintain proper belt tension against the expanding crop roll. Belt take-up and tensioning apparatus of this type are well known in the art and not further discussed in detail herein. Exemplar take-up apparatus are described in U.S. Pat. Nos. 4,870,812 and 5,367,865, both to Jennings et al., each being incorporated herein by reference. The first position corresponds to that shown in FIG. 1 in which a bale is beginning to be formed. This first position is also referred to as the bale core formation position. The second position, shown in FIG. 2 corresponds to a bale that has reached a desired size and is ready to be ejected from the baler.

Figure 3:
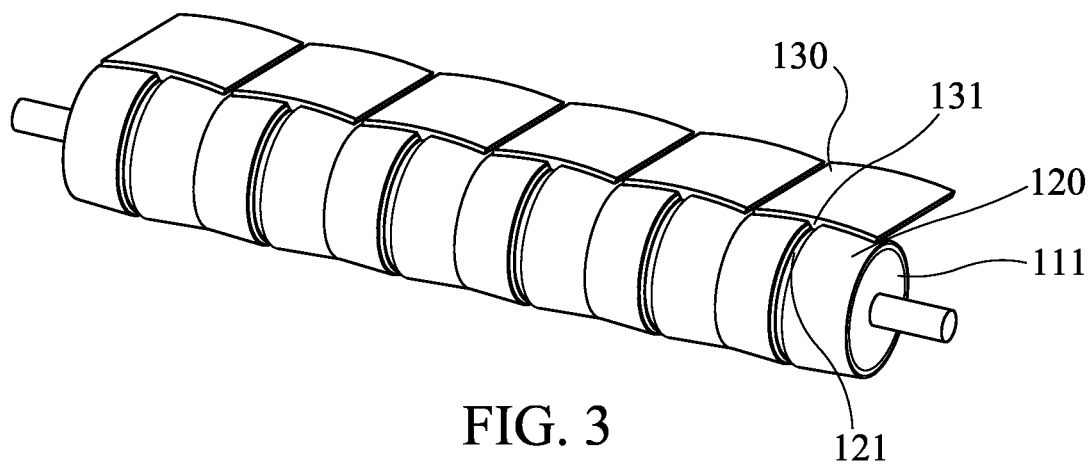
FIG. 3 shows a roller of the belt assembly.

The present invention is directed to a belt assembly comprising the belt guiding rollers 40a, 40b, 41, 42, 44, 49 and the plurality of side-by-side belts 130. In particular, it is directed to the inside belt guiding rollers 40a, 41, 42, 44, 49 which are inside the loop formed by the belts 130 and which contact with the surface of the belts 130 which is opposite the bale-contacting surface. The inside rollers of the belt assembly, as shown in FIG. 3, comprises a flat shaft 111, on which a plurality of belt-driving sleeves 120 are mounted. Each sleeve 120 is preferably configured to drive a single belt 130. The sleeves 120 have at least one circumferential groove 121, preferably central, which is wedge-shaped and may have a form of a trapezoid, a triangle or a semi-circular shape. The belts 130 have at least one longitudinal protrusion 131 positionable in the groove 121. While the belt assembly is driven, the belts are tracked in the grooves 121 and prevented from sideward displacement by the longitudinal protrusions 131 positioned in the grooves 121.

The belt-driving sleeves 120 may have a convex outer surface 125 in which the grooves 121 are formed, in order to further improve the belt tracking, as the tension in the belt 130 increases at its central portion and further biases the belt towards the centre of the sleeve.

Figure 4:
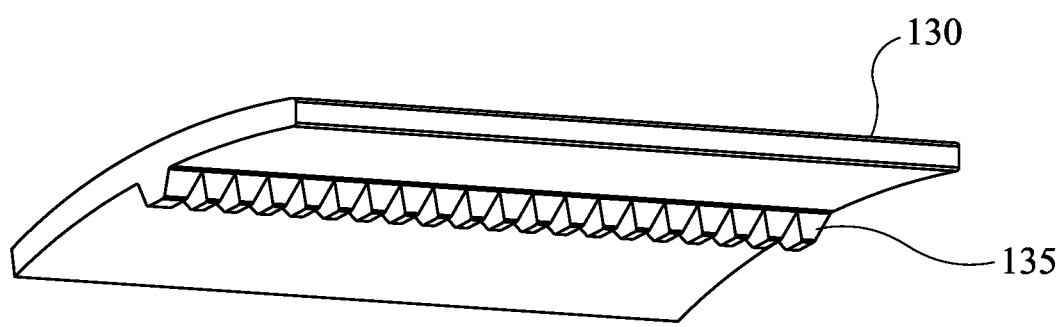
FIG. 4 shows a section of a belt.

The longitudinal protrusion 131 may have a toothed longitudinal cross-section, as shown in FIG. 4. The teeth 135 of the longitudinal protrusion 131 may have a shape of a triangle, a wedge or a semi-circular shape. The toothed shape facilitates bending of the belt 130 about rollers of a small diameter and allows to make a relatively high and rigid protrusion 131, which facilitates tracking and improves the durability of the belt. Moreover, the teeth 135 function as a scraper to remove the debris from the groove 121 of the belt-driving sleeves 120.

Figure 5:
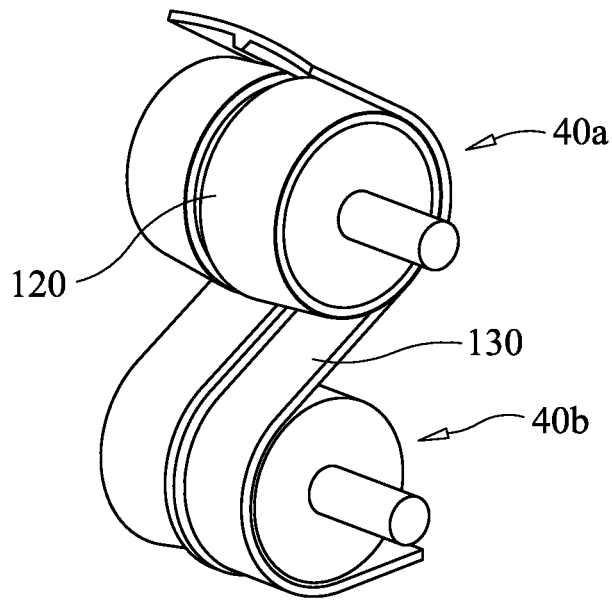
FIG. 5 shows a section of the belt assembly.

As shown in FIG. 5 indicating a section of the belt assembly for a single belt with two rollers 40a, 40b, only the inside rollers 40a contacting the protruded side of the belt 130 need to carry the belt-driving sleeves 120, while the outside rollers 40b contacting the working surface of the belt 130 may be plain.

The belt-driving sleeves 20 are preferably adjacent to each other, as shown in FIG. 3. The width of a single sleeve 120 is larger than the width of the belt 130, to enable clearance between the belts, via which debris can be removed from between the belts.

An individual sleeve for each belt facilitates assembly of the roller and reduces manufacturing costs. Such construction is universal and can be applied to a wide range of baler sizes, such as 6-belt, 7-belt or 8-belt balers in an equivalent manner. A desired number of sleeves 120 are placed on the flat shaft 111 next to each other.

Figure 6:
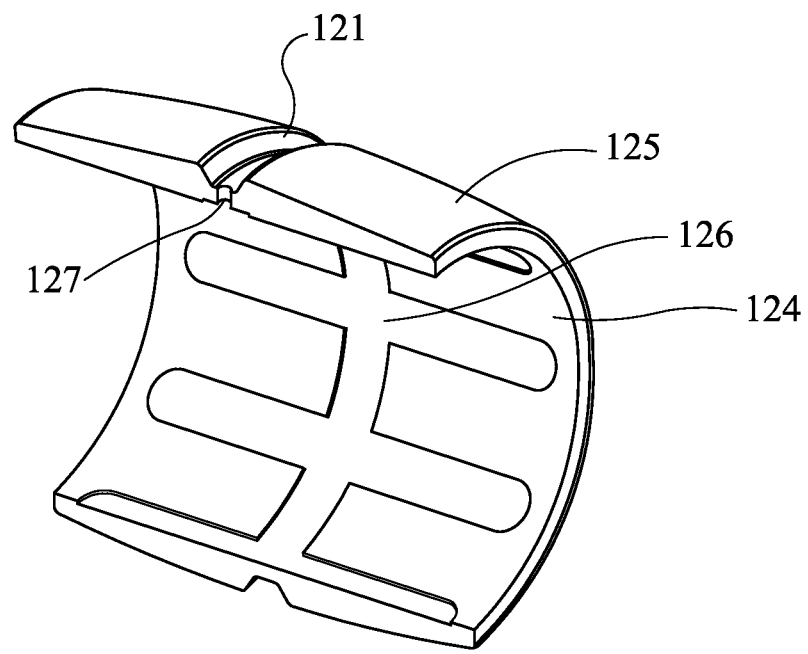
FIG. 6 shows a single sleeve in cross section.

As shown in FIG. 6, the belt-driving sleeves 120 may have a plurality of interconnected channels 126 at the internal surface 124 of the sleeve 120. The channels 126 are connected with an opening 127 in the outer surface of the sleeve, preferably in the central portion of the groove 121. After the sleeves 120 are placed on the shaft, a liquid adhesive may be introduced via the opening 127 to spread throughout the channels 126. Next, the roller may be cured to allow the adhesive to bond the sleeve 120 to the shaft 111.

The height H of the belt-driving sleeve 120 is higher than the depth d of the groove 121, to facilitate mounting the sleeve 120 on a flat shaft 111. In this way the belt-driving sleeves 120 can be mounted on the shaft 111 by inserting the shaft 111 into the central opening of the belt-driving sleeves 120 and subsequently sliding the respective belt driving sleeves 120 along the shaft 111 to the desired position on the shaft 111 where they can be fixed to the shaft 111.

The belt-driving sleeves 120 are preferably molded from rubber or hard plastic, which makes them relatively inexpensive to produce in large batches, universal for different types of belt assemblies.

For a typical 15-cm wide belt, the belt assembly components according to the presented embodiment have the following dimensions. The clearance between the belts is from approximately 10 mm to 15 mm, i.e. about 7%-10% of the belt width. The height H of the belt-driving sleeves 120 is from 10 to 20 mm, while the depth d of the groove is approximately 30%-70% of the sleeve height H, preferably 50%. The channels 126 may have a depth of approximately 1 mm to 3 mm and width of approximately 3 mm to 5 mm.

Figure 7:
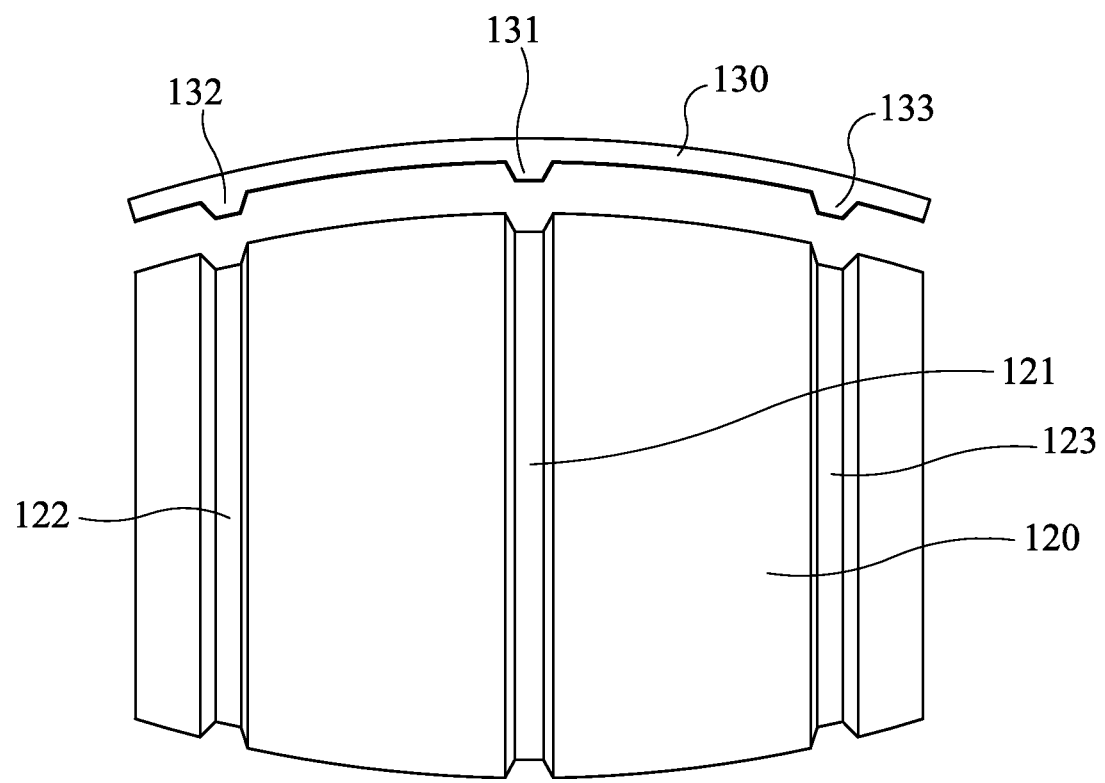
FIG. 7 shows an embodiment of a multi-grooved sleeve and a multi-grooved belt.

As shown in FIG. 7, the belt-driving sleeves 120 may comprise a plurality of grooves 121, 122, 123 to further increase its belt-tracking capabilities for a belt 130 with a plurality of longitudinal protrusions 131, 132, 133.

The invention claimed is:

1. A round baler comprising:
    a bale-forming chamber is at least partially formed by a belt assembly for rolling a bale therein,
    the belt assembly comprising a plurality of belts trained about rollers transverse to the belts,
    wherein each of the rollers comprises a shaft with a plurality of belt-driving sleeves mounted thereon, and the plurality of belt-driving sleeves each having a circumferential groove, the circumferential groove is wedge shaped, and the belts each having a longitudinal protrusion configured to track the belt in the groove of the belt-driving sleeve, wherein the longitudinal protrusions of the belts have toothed longitudinal cross-sections comprising teeth positioned immediately adjacent to each other, wherein the teeth are configured as a scraper to remove debris from the groove, and wherein the belt-driving sleeves are mounted on the shaft immediately adjacent to each other.

2. The round baler according to claim 1, wherein the shaft has a flat surface and the belt-driving sleeves have a height greater than a depth of the groove.

3. The round baler according to claim 2, wherein the depth of the groove is from 30% to 70% of the height of the belt-driving sleeve.

4. The round baler according to claim 1, wherein the belt-driving sleeves have a plurality of interconnected channels at an internal surface of the belt-driving sleeve, the channels being connected with an opening in an outer surface of the belt-driving sleeve, via which an adhesive is introduced between the internal surface of the belt-driving sleeve and the outer surface of the shaft.

5. The round baler according to claim 1, wherein the belt-driving sleeves have a width larger than the width of the belt providing a clearance between the belts such that debris can be removed.

6. The round baler according to claim 1, wherein the belt-driving sleeves have a convex outer surface in which the grooves are formed.

7. The round baler according to claim 1, wherein the belt-driving sleeves are molded from rubber or hard plastic.

8. A round baler comprising a bale-forming chamber with a belt assembly for rolling a bale, the belt assembly comprising:
    a plurality of parallel side-by-side belts trained about rollers transverse to the belts,
    wherein each of the rollers comprises a shaft with a plurality of belt-driving sleeves mounted thereon,
    wherein the belt-driving sleeves each have a convex outer surface and a plurality of circumferential grooves and each of the belts have a plurality of longitudinal protrusions configured to track the belt in the grooves of the belt-driving sleeve and act as a scraper to remove debris from the groove, wherein a first circumferential groove of the plurality of circumferential grooves is located at a central section of the sleeves having a different diameter than a second circumferential groove of the plurality of circumferential grooves located at a side section, and wherein the belt-driving sleeves are mounted on the shaft immediately adjacent to each other.

\* \* \* \* \*